(12) United States Patent
Schüle et al.

(10) Patent No.: US 10,508,639 B2
(45) Date of Patent: Dec. 17, 2019

(54) METHOD AND DEVICE FOR DETECTING AUTOIGNITIONS ON THE BASIS OF MEASURED AND ESTIMATED INTERNAL CYLINDER PRESSURE VALUES OF AN INTERNAL COMBUSTION ENGINE

(71) Applicant: Continental Automotive GmbH, Hanover (DE)

(72) Inventors: Harry Schüle, Neunburg V. Wald (DE); Waldemar Schneider, Patersdorf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 497 days.

(21) Appl. No.: 14/646,466

(22) PCT Filed: Oct. 24, 2013

(86) PCT No.: PCT/EP2013/072327
§ 371 (c)(1),
(2) Date: May 21, 2015

(87) PCT Pub. No.: WO2014/079648
PCT Pub. Date: May 30, 2014

(65) Prior Publication Data
US 2015/0337790 A1     Nov. 26, 2015

(30) Foreign Application Priority Data

Nov. 21, 2012    (DE) .................. 10 2012 221 245

(51) Int. Cl.
*F02P 5/153*      (2006.01)
*F02D 43/04*      (2006.01)
(Continued)

(52) U.S. Cl.
CPC ............ *F02P 5/153* (2013.01); *F02D 35/024* (2013.01); *F02D 43/04* (2013.01); *G01L 23/221* (2013.01)

(58) Field of Classification Search
CPC .... F02D 35/023; F02D 35/024; F02D 35/027; F02D 41/009; F02D 41/22;
(Continued)

(56) References Cited

U.S. PATENT DOCUMENTS

| | | | | |
|---|---|---|---|---|
| 4,455,980 A | * | 6/1984 | Sasayama | F02D 35/023 123/406.23 |
| 4,531,399 A | * | 7/1985 | Aono | F02D 35/023 73/1.59 |

(Continued)

FOREIGN PATENT DOCUMENTS

| | | | | |
|---|---|---|---|---|
| CN | 101163872 A | 4/2008 | ............. | F02D 35/02 |
| DE | 29722031 U1 | 4/1999 | ............. | G01L 23/22 |

(Continued)

OTHER PUBLICATIONS

CN 101163872 A, U.S. Pat. No. 7,275,519 B2.
(Continued)

*Primary Examiner* — Jacob M Amick
*Assistant Examiner* — Michael A Kessler
(74) *Attorney, Agent, or Firm* — Slayden Grubert Beard PLLC

(57) ABSTRACT

A method is provided for detecting autoignition in a spark-ignited internal combustion engine, wherein values for the combustion chamber pressure are measured during a compression stroke of the internal combustion engine at defined crankshaft angles within an evaluation window, a filtered pressure value is determined from the measured values for the combustion chamber pressure, and theoretical pressure values in the combustion chamber that would arise if no (Continued)

combustion took place in the combustion chamber are determined for the defined crankshaft angles. The value of the slope between two defined crankshaft angles for filtered pressure values is determined, the value of the slope between two defined crankshaft angles for theoretical pressure values is determined, and a difference of the slope values is calculated therefrom. This difference is compared with a specified threshold value, and, if the threshold value is exceeded, an autoignition in the combustion chamber is inferred.

13 Claims, 4 Drawing Sheets

(51) Int. Cl.
*F02D 35/02* (2006.01)
*G01L 23/22* (2006.01)

(58) Field of Classification Search
CPC ......... F02D 41/1403; F02D 2200/025; F02D 2200/1012; F02D 2250/14; F02D 2041/1432; F02P 5/152; F02P 5/153; G01L 23/22; G01L 23/221; G01L 23/226
USPC .... 123/435, 406.43, 406.16, 406.21, 406.29, 123/406.34, 406.38; 701/111
See application file for complete search history.

(56) References Cited

U.S. PATENT DOCUMENTS

| | | | | |
|---|---|---|---|---|
| 4,587,839 A | * | 5/1986 | Doniwa | G01M 15/06 33/DIG. 15 |
| 6,810,320 B2 | * | 10/2004 | Yamamoto | F02D 35/023 123/406.14 |
| 7,142,975 B2 | * | 11/2006 | Wang | F02D 35/024 701/114 |
| 7,275,519 B2 | | 10/2007 | Miyazaki et al. | 123/431 |
| 7,461,633 B2 | | 12/2008 | Vangraefschepe | 123/434 |
| 7,542,841 B2 | * | 6/2009 | Yahia | F02D 35/024 123/435 |
| 7,854,218 B2 | | 12/2010 | Kapus et al. | 123/435 |
| 7,861,689 B2 | | 1/2011 | Haug et al. | 123/406.21 |
| 7,909,018 B2 | * | 3/2011 | Ishiguro | F02D 35/023 123/406.11 |
| 8,677,975 B2 | | 3/2014 | Auclair et al. | 123/435 |
| 8,910,615 B2 | | 12/2014 | Suzuki et al. | 123/435 |
| 2010/0312456 A1 | * | 12/2010 | Nishimura | F02D 35/023 701/103 |
| 2011/0246049 A1 | | 10/2011 | Matsuo et al. | 701/111 |

FOREIGN PATENT DOCUMENTS

| | | | | |
|---|---|---|---|---|
| DE | 19859310 A1 | | 6/2000 | ............ F02D 35/02 |
| DE | 10234252 A1 | | 2/2004 | ............ F02D 35/02 |
| DE | 102006015662 A1 | | 10/2006 | ............ F02D 41/00 |
| DE | 102006003265 A1 | | 8/2007 | ............ G01L 23/26 |
| DE | 102006033483 A1 | | 1/2008 | ............ F02D 41/00 |
| DE | 102007039036 A1 | | 3/2008 | ............ F02D 41/00 |
| DE | 102007024415 B3 | | 1/2009 | ............ F02D 41/00 |
| DE | 102007061226 A1 | | 6/2009 | ............ F02D 41/00 |
| EP | 0819925 A2 | | 1/1998 | ............ F02D 45/00 |
| EP | 1826379 A1 | | 8/2007 | ............ F02D 35/02 |
| EP | 2166214 A1 | | 3/2010 | ............ F02D 35/02 |
| JP | 2000110652 A | * | 4/2000 | ............ F02D 45/00 |
| WO | 2012/105012 A1 | | 8/2012 | ............ F02D 41/22 |
| WO | 2014/079648 A1 | | 5/2014 | ............ F02D 35/02 |

OTHER PUBLICATIONS

Chinese Office Action, Application No. 201380060965.3, 14 pages, dated Aug. 29, 2016.
EP 1826379 A1, U.S. Pat. No. 7,461,633 B2.
DE 102007039036 A1, U.S. Pat. No. 7,854,218 B2.
DE 102007024415 B3, U.S. Pat. No. 7,861,689 B2.
EP 2166214 A1, U.S. Pat. No. 8,677,975 B2.
WO 2012/105012 A1, U.S. Pat. No. 8,910,615 B2.
DE 102006033483 A1, U.S. Pat. No. 7,542,841 B2.
International Search Report and Written Opinion, Application No. PCT/EP2013/072327, 22 pages, dated Feb. 20, 2014.
Korean Office Action, Application No. 20157012564, 9 pages, dated Jun. 13, 2019.

* cited by examiner ive Application No. PCT/EP2013/072327 filed Oct. 24, 2013, which designates the United States of America, and claims priority to DE Application No. 10 2012 221 245.0 filed Nov. 21, 2012, the contents of which are hereby incorporated by reference in their entirety.

METHOD AND DEVICE FOR DETECTING AUTOIGNITIONS ON THE BASIS OF MEASURED AND ESTIMATED INTERNAL CYLINDER PRESSURE VALUES OF AN INTERNAL COMBUSTION ENGINE

CROSS-REFERENCE TO RELATED APPLICATIONS

This application is a U.S. National Stage Application of International Application No. PCT/EP2013/072327 filed Oct. 24, 2013, which designates the United States of America, and claims priority to DE Application No. 10 2012 221 245.0 filed Nov. 21, 2012, the contents of which are hereby incorporated by reference in their entirety.

TECHNICAL FIELD

The invention relates to a method and to a device for detecting autoignitions in an internal combustion engine.

BACKGROUND

In internal combustion engines, various combustion faults, referred to as unusual combustion processes, can occur which are not triggered or not exclusively triggered by the ignition spark of the spark plug but rather by spontaneous ignition. This includes, in particular, knocking combustion, premature ignition and autoignitions.

While premature ignition is a sporadically occurring event which disappears again after a certain number of working cycles, autoignitions are self-reinforcing processes of unusual combustion before the usual ignition time. The triggers here are hot surfaces and overheated components such as, for example, electrodes of spark plugs, outlet valves, sharp, over-heated edges in the combustion chamber or excessively hot combustion chamber walls. As a result of spontaneous ignition which takes place too early, the pressure and the temperature in the combustion chamber continue to rise and the triggering component or surface heats up even more. In the next cycle, the autoignition then occurs even earlier and the combustion chamber temperature rises further. This unusual combustion is often associated with pronounced knocking. In the end phase, in which the spontaneous ignition finds its steady-state point, the ignition time is so early that knocking can no longer be perceived. This autoignition cannot be prevented by adjusting the ignition angle.

As a result of the high thermal loading of the combustion chamber, damage or even total destruction of the piston can occur and the electrodes of the spark plug or parts of the outlet valves which are subject to high loading in any case can melt.

In order to avoid the occurrence of combustion faults such as, for example, knocking combustion, document DE 10 2006 015 662 A1 proposes detecting noise in the internal combustion engine by what are referred to as knocking sensors, and the noise for each combustion cycle serves to form cylinder-specific signals. In this context, a monitored cylinder is switched off, i.e. the supply of fuel to this cylinder is interrupted, for example, if knocking owing to pre-ignition occurs, i.e. if the current signal values and the signal values which are specific to this cylinder exceed predefined setpoint values.

EP 0 819 925 A2 discloses a method for detecting early ignition at a spark-ignited internal combustion engine. In this context, a signal of a knocking sensor is acquired at various time intervals. By using the acquired signal of the knocking sensor it is detected whether abnormal vibration is occurring. In addition it is checked whether the frequency of the time intervals of the abnormal vibration exceeds a defined threshold. If this is the case, early ignition is detected.

DE 10 234 252 A1 discloses a method for detecting combustion misfires. In order to improve the detection quality, two different measuring methods are used which operate according to different physical principles. One of the methods detects the rotational speed of the crankshaft, and the other method detects the stream of ions in the combustion chamber.

DE 198 59 310 A1 discloses an engine regulating device which has a pre-ignition-detection device for detecting pre-ignition in at least one combustion chamber. A setting device is provided for setting at least one engine parameter. Furthermore, a control loop is provided between the pre-ignition-detection device and the setting device for suppressing detected pre-ignition by adjusting the engine parameter.

DE 10 2007 024 415 B3 describes a method for detecting autoignition of a spark-ignited internal combustion engine with at least one cylinder which is connected to a crankshaft. According to the method, a rotational speed of the crankshaft is measured during a compression stroke of the cylinder during a first time interval in the working sequence of the internal combustion engine. In addition, a knocking signal during a working stroke of the cylinder is detected during a second time interval in the working sequence of the internal combustion engine. Autoignition of the cylinder is detected if the rotational speed of the crankshaft has slowed down compared to a comparison value, and knocking combustion is detected on the basis of the knocking signal.

SUMMARY

One embodiment provides a method for detecting autoignition in a spark-ignited internal combustion engine having at least one cylinder which, together with a piston connected to a crankshaft, bounds a combustion chamber, a combustion chamber pressure sensor for measuring the pressure in the combustion chamber, a crankshaft angle sensor which supplies a signal which represents the crankshaft angle, a control device for performing open-loop and/or closed-loop control of the internal combustion engine, wherein during a compression stroke of the internal combustion engine, values for the combustion chamber pressure are acquired at defined crankshaft angles within an evaluation window, a filtered pressure value is obtained from the acquired values for the combustion chamber pressure, theoretical pressure values in the combustion chamber which would occur if no combustion were to take place in the combustion chamber are determined for the defined crankshaft angles, the value of the gradient between two defined crankshaft angles for filtered pressure values is acquired, the value of the gradient between two defined crankshaft angles is obtained for theoretical pressure values, the value of the difference of the gradient values is formed, this difference is compared with a predefined threshold value, and when the threshold value is exceeded, autoignition in the combustion chamber is inferred.

In a further embodiment, the filtering of the measured values for the combustion chamber pressure is carried out by means of the formation of sliding mean values.

In a further embodiment, the theoretical pressure values are calculated by means of a thermodynamic model in which the crankshaft angle, a coolant temperature, an engine oil temperature, a pressure value in an intake manifold of the internal combustion engine and the geometric variables of the crank drive are taken into account.

In a further embodiment, the theoretical pressure values are stored in a value memory of the control device in the form of characteristic diagrams.

In a further embodiment, whenever the threshold value is exceeded, the counter reading of a counter contained in the control device is increased, and when a predefined threshold value for the counter reading is reached, autoignition in the combustion chamber is inferred.

In a further embodiment, it is checked whether the exceeding of the threshold value has taken place for the difference between the gradient values for a crankshaft angle which is smaller with respect to the ignition top dead center and a predefined threshold value, and in the event of a positive result of the interrogation the counter reading is increased more quickly.

In a further embodiment, when autoignition is detected, measures that result in a decrease in the temperature in the combustion chamber are initiated by means of the control device.

In a further embodiment, one or more of the following steps are initiated: setting a rich air/fuel mixture, closing the throttle valve of the internal combustion engine, shutting off the fuel supply, and opening a wastegate of an exhaust gas turbocharger of the internal combustion engine.

Another embodiment provides a device for detecting autoignition in a spark-ignited internal combustion engine which is configured to execute a method as disclosed above.

BRIEF DESCRIPTION OF THE DRAWINGS

Example embodiments of the invention are discussed in greater detail below, with reference to the drawings, in which.

DETAILED DESCRIPTION

Figure 1:
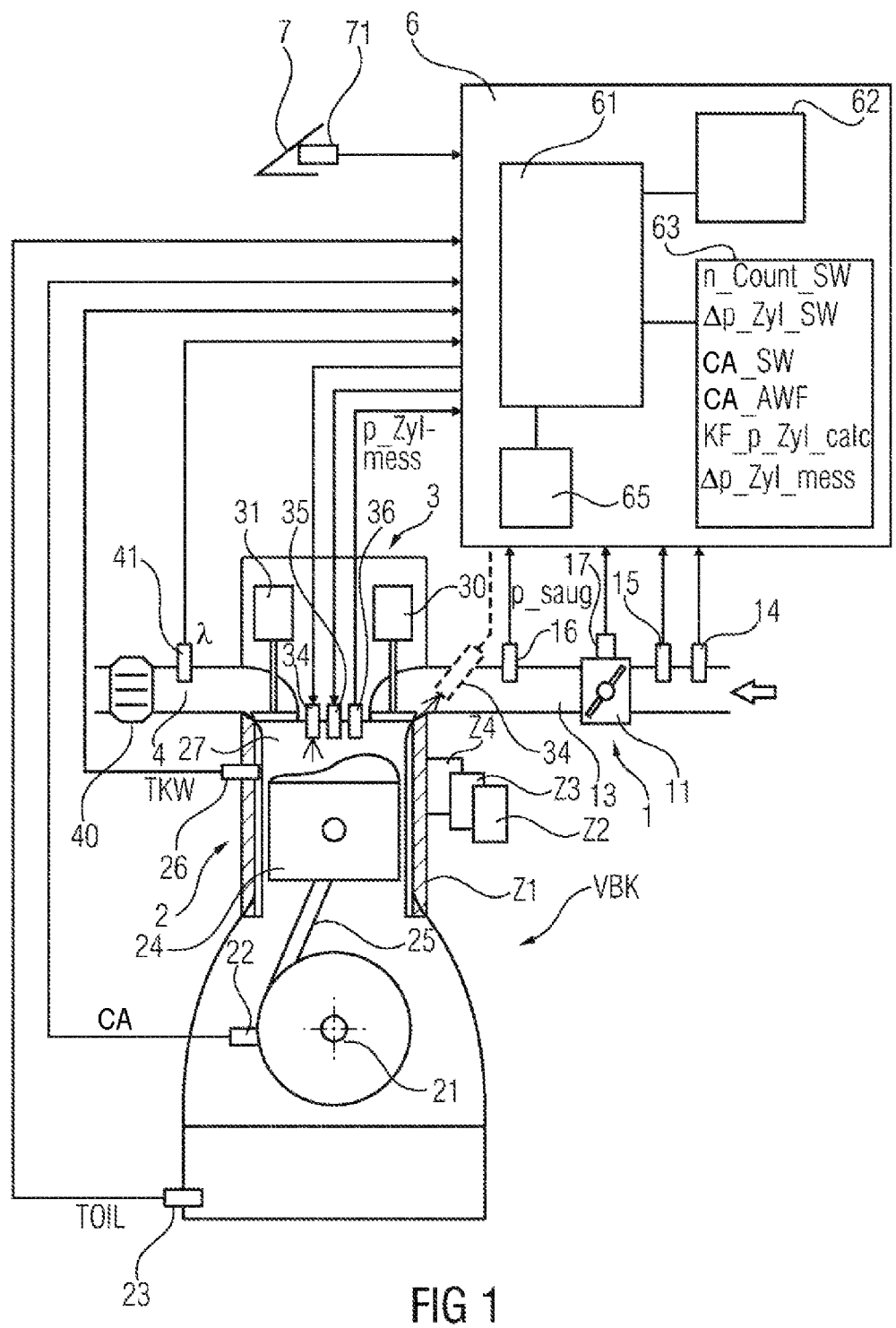
FIG. 1 is a schematic illustration of an internal combustion engine with an associated control device.

Embodiments of the invention provide a method and a device which permit reliable detection of autoignitions during operation of an internal combustion engine.

Some embodiments provide a method and a corresponding device for detecting autoignition in a spark-ignited internal combustion engine having at least one cylinder which, together with a piston connected to a crankshaft, bounds a combustion chamber, a combustion chamber pressure sensor for measuring the pressure in the combustion chamber, a crankshaft angle sensor which supplies a signal which represents the crankshaft angle, a control device for performing open-loop and/or closed-loop control of the internal combustion engine. During a compression stroke of the internal combustion engine, values for the combustion chamber pressure are acquired at defined crankshaft angles within an evaluation window, a filtered pressure value is obtained from the acquired values for the combustion chamber pressure, and theoretical pressure values in the combustion chamber which would occur if no combustion were to take place in the combustion chamber are determined for the defined crankshaft angles. The value of the gradient between two defined crankshaft angles for filtered pressure values is acquired, and the value of the gradient between two defined crankshaft angles for theoretical pressure values is determined and a difference in the gradient values is formed therefrom. This difference is compared with a predefined threshold value, and when the threshold value is exceeded, autoignition in the combustion chamber is inferred.

By using the method and device according to the invention it is possible to detect autoignitions reliably and in a simple and cost-effective way, and components in the combustion chamber of the internal combustion engine can be effectively protected against thermal overloading.

According to one embodiment, the filtering of the measured values for the combustion chamber pressure is carried out by means of the formation of sliding mean values. Such smoothing prevents a relatively low pressure value which is triggered by knocking from being used by chance.

According to a further embodiment, the theoretical pressure values are calculated by means of a thermodynamic model in which the crankshaft angle, a coolant temperature, an engine oil temperature, a pressure value in an intake manifold of the internal combustion engine and the geometric variables of the crank drive are taken into account. All the variables for the thermodynamic calculation of the pressure profile are present in any case in the control device, with the result that a very simple and cost-neutral way of determining this pressure profile is provided.

If the theoretical pressure values are not calculated separately online for each sampled crankshaft angle, but instead obtained in advance and stored in characteristic diagrams of a memory of the control device, a simple assignment is obtained which can allow a saving in terms of a computational capacity in the control device.

According to a further embodiment, autoignition is not already inferred when the threshold value is exceeded once but instead a counter reading of a counter contained in the control device is increased, and when a predefined threshold value for the counter reading is reached, autoignition in the combustion chamber is inferred. This increases the evaluation reliability, and individual incorrect interpretations of measurement results owing to pre-ignition can be reliably avoided.

Since the autoignitions are more dangerous the earlier they occur (with respect to the crankshaft angle CA before the usual ignition time), according to one advantageous development of the invention it is checked at which crankshaft angle the difference between the gradients has exceeded the threshold value. If the result has occurred at a crankshaft angle which is smaller than a predefined threshold value, the counter reading of the counter is increased more quickly, for example incremented by the value 2, and in contrast to a value 1 if the result has taken place at a later crankshaft angle.

By means of such weighting of the time of the occurrence of the autoignition, it is possible to react more quickly to an accelerated increase in temperature owing to the autoignition occurring very early in the combustion chamber, i.e. the temperature-reducing measures are initiated more quickly.

According to a further embodiment, the measures for reducing the temperature in the combustion chamber comprise setting a rich air/fuel mixture, closing the throttle valve of the internal combustion engine, and opening a wastegate of an exhaust gas turbocharger of the internal combustion engine. The load-reducing measures can be carried out with methods which are already implemented in the control device, with the result that no additional expenditure on components or algorithms is necessary.

An internal combustion engine VBK (FIG. 1) comprises an intake section 1, an engine block 2, a cylinder head 3 and an exhaust gas section 4. The intake section 1 preferably comprises a throttle valve 11, and in addition an intake manifold 13 which extends from a cylinder Z1 into the engine block 2 via an inlet duct. The engine block 2 also comprises a crankshaft 21 which is coupled to a piston 24 of the cylinder Z1 via a connecting rod 25. The cylinder Z1 and the piston 24 bound a combustion chamber 27.

The cylinder head 3 comprises a valve drive with a gas inlet valve 30, a gas outlet valve 31 and corresponding valve drives (not denoted in more detail). The cylinder head 3 also comprises a spark plug 35, a combustion chamber pressure sensor 36, also referred to as a cylinder pressure sensor, and an injection valve 34. Alternatively, the injection valve 34 can also be arranged in the intake section 1, as is shown by the dot-dash illustration in FIG. 1.

The exhaust gas section 4 comprises an exhaust gas catalytic converter 40 which is preferably embodied as three-way catalytic converter. An exhaust gas probe 41 is arranged upstream of the exhaust gas catalytic converter 40.

A control device 6 is provided to which sensors are assigned which acquire various measurement variables and obtain the measured values of the measurement variable. Operating variables comprise not only the measurement variables but also variables derived therefrom. The control device 6 actuates, as a function of at least one of the operating variables, the actuator elements which are assigned to the internal combustion engine VBK, and to which corresponding actuator drives are respectively assigned, by generating actuation signals for the actuator drives.

The control device 6 can also be referred to as a device for operating the internal combustion engine.

The sensors are a pedal position signal transmitter 71 which senses the position of an accelerator pedal 7, an air mass meter 14 which senses an air mass flow upstream of the throttle valve 11, a temperature sensor 15 which senses an intake air temperature, a pressure sensor 16 which senses an intake manifold pressure, a throttle valve position sensor 17 which senses an angle of aperture of the throttle valve 11, a crankshaft angle sensor 22 which senses a crankshaft angle CA and to which a rotational speed N is then assigned, a temperature sensor 23 which senses an oil temperature TOIL, a temperature sensor 26 which senses a coolant temperature TCA of the internal combustion engine VBK, the combustion chamber pressure sensor 36 which senses a pressure in the combustion chamber of the internal combustion engine VBK, and the exhaust gas probe 41 which senses a residual oxygen content of the exhaust gas and whose measurement signal is characteristic of the air/fuel ratio in the cylinder Z1 during the combustion of the air/fuel mixture. The exhaust gas probe 41 is preferably embodied as a linear lambda probe and therefore generates, over a wide relevant range of the air/fuel ratio, a measurement signal $\lambda$ which is proportional thereto.

Depending on the embodiment, a subset of the specified sensors may be present or additional sensors may also be present.

The actuator elements are, for example, the throttle valve 11, the gas inlet valve 30 and outlet valve 31, the injection valve 34 and the spark plug 35.

In addition to the cylinder Z1, further cylinders Z2 to Z4 may also be present, to which cylinders Z2 to Z4 corresponding sensors and actuator elements are then also assigned.

The control device 6 preferably comprises a computing unit (processor) 61 which is coupled to a program memory 62 and a value memory (data memory) 63. The computing unit 61, the program memory 62 and the value memory 63 can each comprise one or more microelectronic components. Alternatively, these components can be partially or completely integrated into a single microelectronic component. Programs and values which are necessary for operating the internal combustion engine VBK are stored in the program memory 61 and the value memory 63. In particular, a method for detecting unusual combustion is implemented, which method is executed by the computer unit 61, as will be explained in more detail below with reference to FIGS. 2 to 4, while the internal combustion engine VBK is operating.

In addition, the computing unit 61 is connected to a counter 65 for summing the number of unusual combustion processes which occur.

Stored in the value memory 63 are inter alia a threshold value for combustion chamber pressure gradients $\Delta p\_Zyl\_SW$, a threshold value for a counter reading $n\_count\_SW$ of the counter 65, a starting value and end value, expressed in crank angles which define an evaluation window CA_AWF for determining autoignitions, and a threshold value CA_SW for a crankshaft angle, the meanings of which will be explained in more detail below with reference to FIGS. 2 to 4. Furthermore, values for obtained combustion chamber pressure gradients $p\_Zyl\_mess$ are buffered in the value memory 63 in order to be processed further later.

Figure 2:
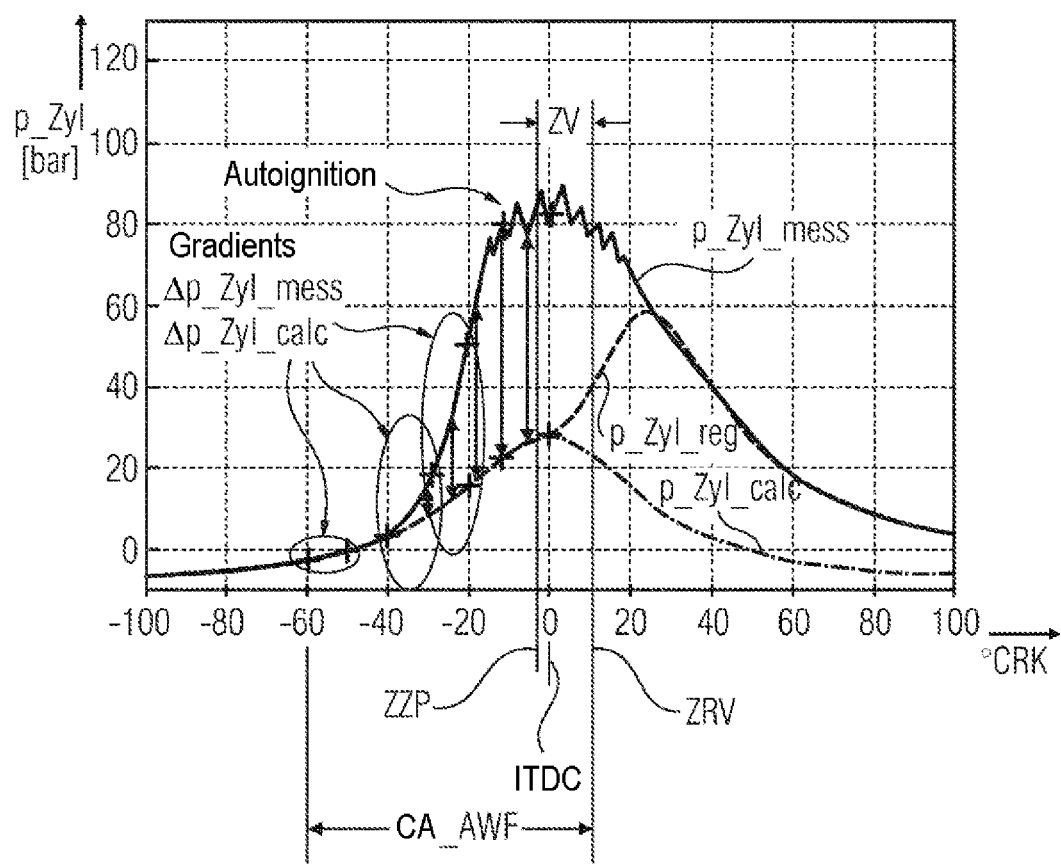
FIG. 2 is a diagram showing various pressure profiles in a combustion chamber of an internal combustion engine as a function of the crankshaft angle.

FIG. 2 shows various profiles of the combustion chamber pressure $p\_Zyl$, often also referred to in simplified form as cylinder pressure, illustrated as a function of crankshaft angle CA [°]. The reference sign $p\_Zyl\_reg$ refers to a typical pressure profile such as occurs during usual combustion of the air/fuel mixture. Usual combustion is to be understood in this context as meaning combustion which is initiated exclusively by an ignition spark of the spark plug and during which no knocking, pre-ignition or autoignition occurs at all. The position of the ignition time is dependent on the load and the rotational speed and is characterized by the reference sign ZZP. In this exemplary embodiment, the ignition time is at approximately 5° CA crankshaft angle before the ignition top dead center. During usual combustion, the peak pressure is at approximately 20° CA crankshaft angle after the ignition top dead center.

The reference sign $p\_Zyl\_mess$ characterizes the combustion chamber pressure which is sensed by means of the combustion chamber pressure sensor 36 and which occurs during operation of the internal combustion engine VBK when unusual combustion processes occur.

The reference sign $p\_Zyl\_calc$ in FIG. 2 characterizes a thermodynamically calculated curve of the combustion chamber pressure without combustion. The maximum value of the pressure occurs here precisely at the ignition top dead center. The thermodynamically calculated combustion chamber pressure profile without combustion $p\_Zyl\_calc$ is a purely theoretical profile, for the calculation of which, in particular, the crankshaft angle CA, the coolant temperature TCA, the oil temperature T_OIL and the intake manifold pressure $p\_saug$ in the compression phase are used.

Furthermore, in FIG. 2 the reference sign ZV denotes the ignition delay. The ignition delay ZV is the time period between the ignition time ZZP, that is to say the time when the primary ignition coil current is switched off and by which means the ignition spark and therefore the ignition of the air/fuel mixture is directly initiated, and the time of the start ZRV of the usual combustion.

The angular range which is characterized by the reference sign KF_AWF defines an evaluation window within which the detection of autoignitions is appropriate. In this example, the lower limit of the evaluation window CA_AWF is at −60° CA with respect to the ignition top dead center, and the upper limit of the evaluation window CA_AWF is at 10° CA, likewise with respect to the ignition top dead center. This value coincides here with the time ZRV, that is to say the start of the usual combustion.

In FIG. 2, the associated gradients Δp_Zyl_mess and Δp_Zyl_calc are plotted within the evaluation window CA_AWF both for the measured combustion chamber pressure curve p_Zyl_mess and for the calculated combustion chamber pressure curve p_Zyl_calc, in each case between two successive sampled values.

Considered in mathematical terms, this is the gradient of the secant through the two sampled points, and is also referred to as the differential quotient.

The number of gradients to be formed and the distance between the sampled values, expressed in ° CA can be freely selected. In this example, the sampling takes place every 10° CA. By way of example, in each case three gradients are shown, specifically a first between −60° CA and −50° CA, a second between −40° CA and −30° CA and a third between −30° CA and −20° CA.

The gradients between adjacent sampled values represent the gradient of the combustion chamber pressure curve in a first approximation. The closer the sampled values are to one another, the more precise the approximation to the curve profile. If the two sampled values coincide, the tangent at this point of the curve is obtained as a borderline case.

In the text which follows, the method for detecting autoignitions will be explained in more detail with reference to FIGS. 3 and 4.

In a step S1, the method is started in that, if appropriate, variables are initialized and counter readings are reset. The initial pass run through the method is preferably carried out under close to real time conditions with respect to a start of the internal combustion engine and can subsequently be called periodically at certain time intervals.

In a step S2 it is interrogated whether certain enabling conditions for carrying out the method are met.

As already mentioned at the beginning, autoignition occurs only if temperatures of components in the combustion chamber, such as the spark plug, outlet valve, piston head or squeezed edges in the cylinder head locally exceed the spontaneous ignition temperature of the injected fuel. Typical values for such temperatures are approximately 1100-1200° C. depending on the quality of the fuel. The method therefore has to be carried out if it is to be expected that these temperatures will be reached owing to the instantaneous operating point of the internal combustion engine VBK. One or preferably more of the parameters of the coolant temperature TCA, oil temperature TOIL, running time of the internal combustion engine VBK since the last start, rotational speed, load variables such as intake manifold pressure, air mass flow and throttle valve position can be used as an indication for this and compared with associated threshold values.

If the internal combustion engine VBK is operated, for example, with a low load and rotational speed, the enabling conditions are not met and the processing is continued again in the step S2, if appropriate after a predefinable waiting time period TWAIT (step S3).

If the interrogation in step S2 reveals that at least one of the threshold values is exceeded, the method is continued in a step S4. The current value of the crankshaft angle CA is acquired using the crankshaft angle sensor 22 and it is subsequently checked whether this value CA is within the defined evaluation window CA_AWF (cf. FIG. 2). If this is not the case, a jump back to step S2 takes place.

If the current crankshaft angle CA lies in the evaluation window CA_AWF, in a step S5, for defined crankshaft angles CA, in this example every 10° CA, the combustion chamber pressures p_Zyl_mess occurring here are acquired using the combustion chamber pressure sensor 36. Depending on the type of combustion chamber pressure sensor 36 used, the supplied raw signal may need to be corrected. In the case of a piezoelectric pressure pickup, there is, for example, the problem of the thermoshock behavior, i.e. when the sensor element becomes hot a charge shift occurs within the quartz and as a result an incorrect value for the pressure is obtained. Therefore, in a step S6 an offset correction of the signal p_Zyl_mess which is supplied by the combustion chamber pressure sensor 36 is carried out in a known fashion. For example the plausibility of the pressure signal p_Zyl_mess can be checked during the intake phase of the internal combustion engine VBK, that is to say when combustion has not yet taken place, with the signal of the intake manifold sensor 16, and as a result a correction signal can be obtained.

Furthermore, in the step S6 the pressure values p_Zyl_mess which are obtained are subjected to filtering, for example, to the formation of sliding mean values, in order to avoid obtaining by chance a relatively low pressure value which is triggered by knocking. This value is referred to as p_Zyl_mess_MW.

In a step S6', the gradient p_Zyl_mess between two adjacent sampled values is calculated from the values obtained in step S6.

In parallel with the acquisition, correction and filtering of the measured combustion chamber pressure signals in the steps S5 and S6 as well as the calculation of the gradient Δp_Zyl_mess from measured combustion chamber pressure values in step S6', in a step S7 the profile of the combustion chamber pressure which would be set without combustion is calculated thermodynamically. In addition to geometric variables of the crank drive such as cubic capacity, compression ratio, the coolant temperature TCA, the oil temperature TOIL, the intake manifold pressure p_saug and the polytropic coefficient are included in the calculation of this theoretical pressure profile p_Zyl_calc depending on the crankshaft angle CA.

In addition to such online calculation of the pressure profile p_Zyl_calc without combustion in the computer unit 61 of the control device 6 for each sampled crankshaft angle CA within the evaluation window CA_AFW, this pressure profile p_Zyl_calc can also be calculated in advance for various parameter configurations and be stored in characteristic diagrams KF_p_Zyl_calc of the value memory 63 of the control device 6.

In a step S7', the gradient p_Zyl_mess between two adjacent sampled values is calculated from the values obtained in step S7.

In a subsequent step S8, the values calculated in the steps S6' and S7' for the gradients are compared with one another. For this purpose, the difference Δp_Zyl between the value of the gradient formed from measured combustion chamber pressures Δp_Zyl_mess and the gradient formed from calculated combustion chamber pressures Δp_Zyl_calc is formed.

Subsequently, in a step S9 it is checked whether this value of the difference Δp_Zyl exceeds a predefined threshold value Δp_Zyl_SW. The threshold value Δp_Zyl_SW is obtained experimentally and is stored in the value memory 63.

If the interrogation in step S9 yields a negative result (no), this means that no unusual combustion has occurred and the method is continued again in step S2.

If the condition of the step S9 is met, unusual combustion is inferred, and in a step S10 the counter reading n_count of the counter 65 which is contained in the control device 6 and sums the number of unusual combustion processes is increased by the value 1.

In a subsequent step S11 it is interrogated whether the counter reading n_count has exceeded a predefined threshold value n_count_SW. If this is the case, in a step S12 the occurrence of autoignitions is detected and measures are initiated which result in a reduction in the combustion chamber temperature. For example, a rich air/fuel mixture can be set in order to achieve cooling within the combustion chamber. A reduction in the load, for example by closing the throttle valve, switching off the fuel supply or opening a wastegate in the case of a supercharged internal combustion engine likewise brings about a reduction in the temperature in the combustion chamber.

If these measures are initiated, the method is ended in a step S13.

Figure 3:
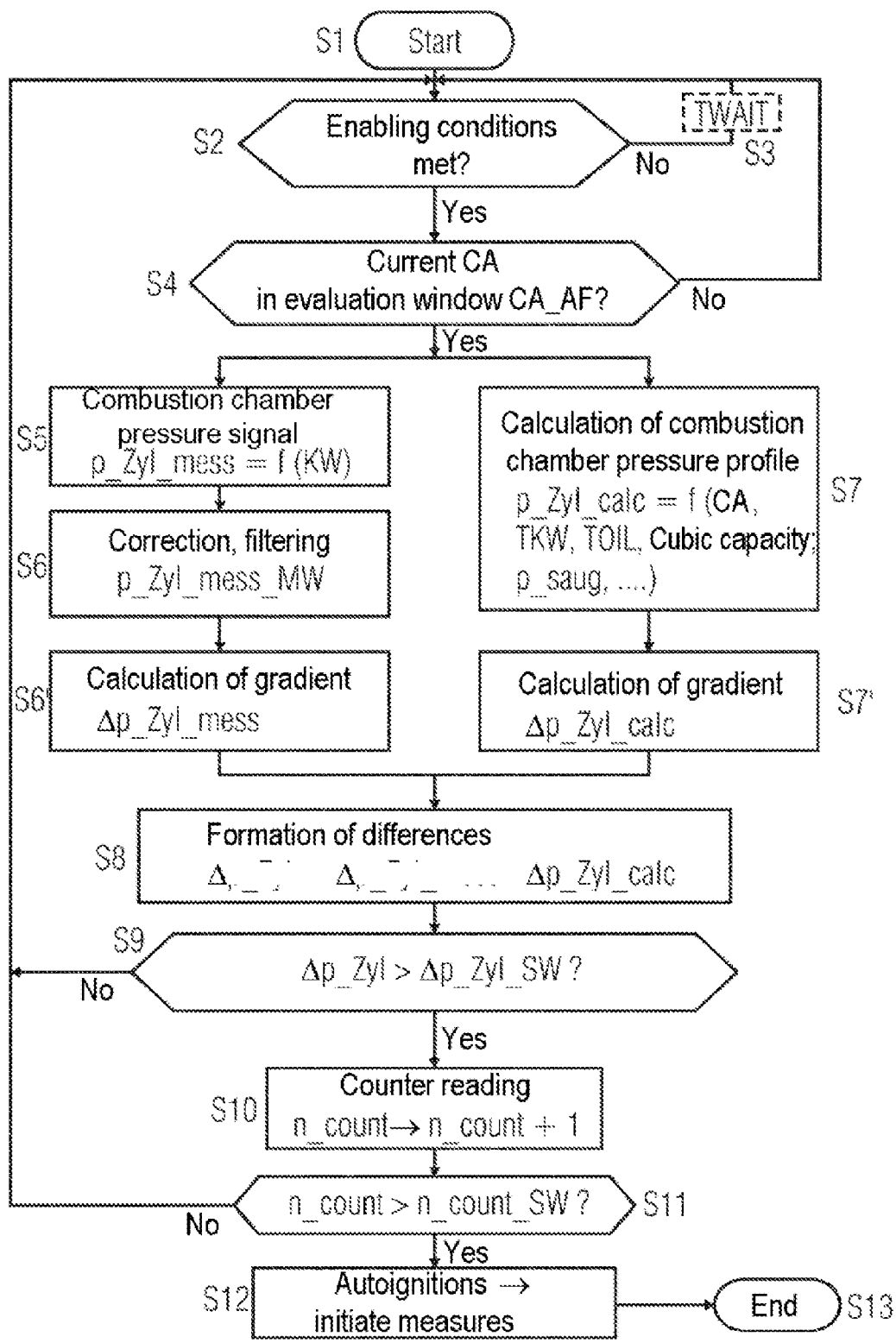
FIG. 3 is a flowchart of a program for detecting unusual combustion processes in an internal combustion engine.
Figure 4:
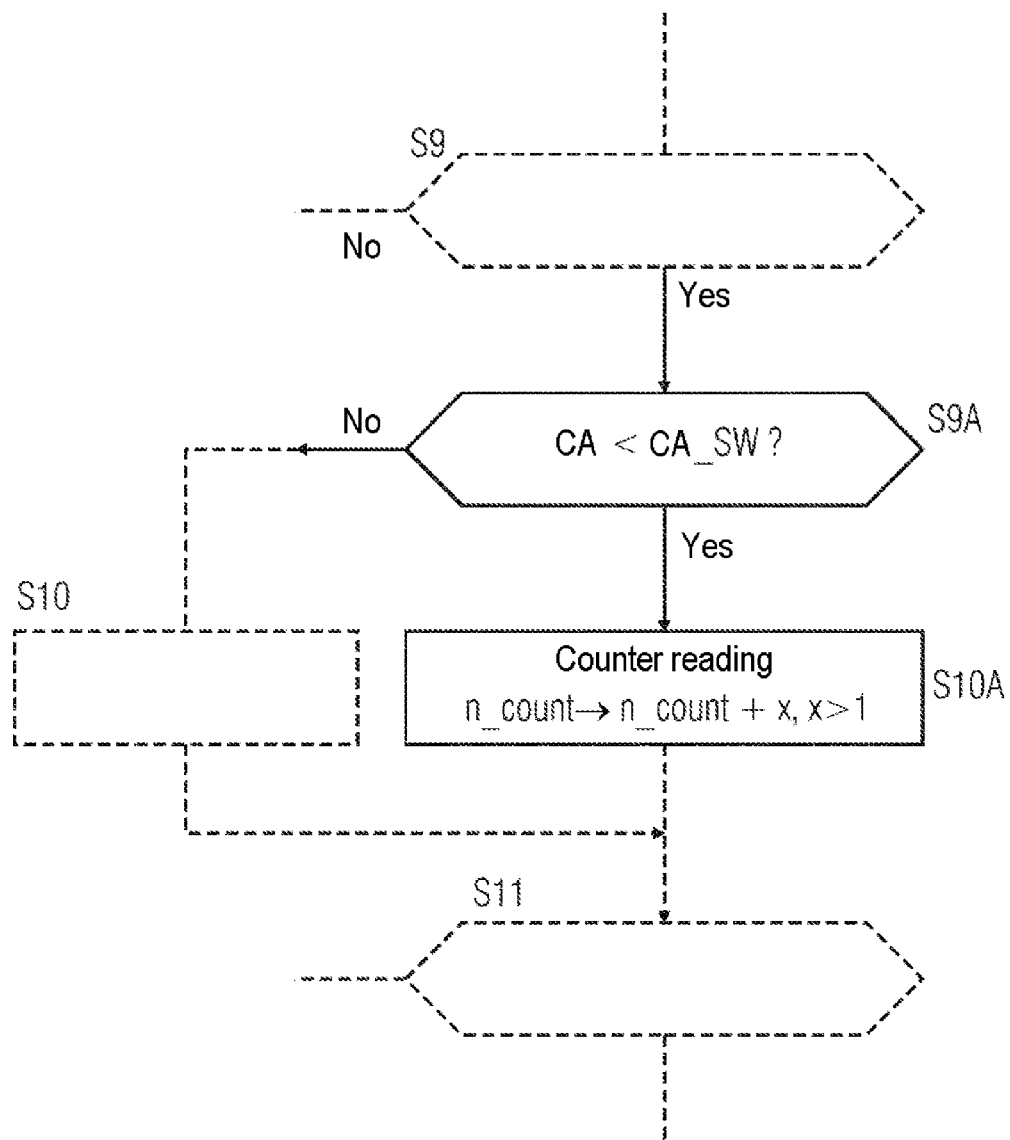
FIG. 4 shows a refinement of the flowchart illustrated in FIG. 3.

Since the autoignitions are more dangerous the earlier they occur (with respect to the crankshaft angle CA before the usual ignition time), FIG. 4 shows a refinement of the method sequence which is described with reference to FIG. 3, which takes into account this fact.

For this purpose, two further steps S9A and S10A are added to the method according to FIG. 3, said steps S9A and S10A being additionally carried out in the chronological processing of the method between the steps S9 and S10. The remaining steps of the method according to FIG. 4 are identical to the corresponding steps in FIG. 3.

If it is detected in the step S9 that the difference between the gradient values Δp_Zyl has exceeded the threshold value Δp_Zyl_SW, in the step S9A it is checked whether the high gradient value has occurred at a crankshaft angle CA which is smaller than a predefined threshold value CA_SW. If this is not the case, the method is continued in the step S10 already described.

If the interrogation reveals that the high gradient has already occurred very early, i.e. at a crankshaft angle CA which is less than the threshold value CA_SW, in the step S10A the counter reading n_count is not incremented by the value 1 as in the case of the method according to FIG. 3, but rather by a value which is greater than 1. As a result, the threshold value n_count_SW is reached more quickly and the measures for lowering the temperature engage earlier. Such weighting of the crankshaft angles at which the autoignitions occur allows the thermally loaded components in the combustion chamber to be protected better.

The method is subsequently continued with the step S11, as already described with reference to FIG. 3.

LIST OF REFERENCE SIGNS

1 Intake section
11 Throttle valve
13 Intake manifold, inlet duct
14 Air mass meter
15 Temperature sensor for intake air
16 Intake manifold pressure
17 Throttle valve position sensor
2 Engine block
21 Crankshaft
22 Crankshaft angle sensor
23 Oil temperature sensor
24 Piston
25 Connecting rod
26 Coolant temperature sensor
27 Combustion chamber
3 Cylinder head
30 Gas inlet valve
31 Gas outlet valve
34 Injection valve
35 Spark plug
36 Combustion chamber pressure sensor
4 Exhaust gas section
40 Exhaust gas catalytic converter
41 Exhaust gas probe
6 Control device
61 Computing unit, processor
62 Program memory
63 Value memory, data memory
65 Counter
7 Accelerator pedal
71 Pedal position signal transmitter
p_saug Intake manifold pressure
p_Zyl Combustion chamber pressure
p_Zyl_mess Measured combustion chamber pressure
p_Zyl_mess_MW Mean value of combustion chamber pressure
p_Zyl_calc Calculated combustion chamber pressure
p_Zyl_reg Usual combustion chamber pressure profile without autoignition
Δp_Zyl_mess Gradient formed from measured combustion chamber pressure values
Δp_Zyl_calc Gradient formed from calculated combustion chamber pressure values
Δp_Zyl Difference between gradient values
Δp_Zyl_SW Threshold value for gradient
KF_p_Zyl_calc Characteristic diagram calculated pressure profile
CA Crankshaft angle in degrees
CA_SW Threshold value for crankshaft angle
CA_AWF Evaluation window for autoignition
λ Air ratio
N Rotational speed
n_count_SW Threshold value for counter for number of unusual combustion processes
S1-S3 Combustion steps
TCA Coolant temperature
TOIL Oil temperature
TWAIT Waiting period
VBK Internal combustion engine
Z1-Z4 Cylinder
ZZP Ignition time
ZV Ignition delay
ITDC Ignition top dead center
ZRV Start of usual combustion

What is claimed is:

1. A method for detecting and responding to autoignition in a spark-ignited internal combustion engine having at least one cylinder which, together with a piston connected to a crankshaft, bounds a combustion chamber, a combustion chamber pressure sensor for measuring the pressure in the combustion chamber, a crankshaft angle sensor which supplies a signal which represents a crankshaft angle, and a control device for performing open-loop and/or closed-loop control of the internal combustion engine, the method comprising:

during a compression stroke of the internal combustion engine, acquiring values for the combustion chamber pressure at defined crankshaft angles within an evaluation window, determining filtered pressure values from the acquired values for the combustion chamber pressure, determining, for the defined crankshaft angles, theoretical pressure values in the combustion chamber that would occur if no combustion were to take place in the combustion chamber based at least in part on geometric variables of the internal combustion engine including at least one of a cubic capacity and a compression ratio, determining a value of a filtered pressure gradient between filtered pressure values for two defined crankshaft angles, determining a value of a theoretical pressure gradient between theoretical pressure values for two defined crankshaft angles, determining a difference between the value of the filtered pressure gradient and the value of the theoretical pressure gradient, comparing the determined difference with a predefined threshold value, identifying an autoignition in the combustion chamber in response to determining that the difference exceeds the predefined threshold value; and initiating a measure that results in a temperature decrease in the combustion chamber if an autoignition is identified, wherein the measure comprises one or more of the following:
  setting a rich air/fuel mixture,
  closing a throttle valve of the internal combustion engine,
  shutting off a fuel supply, or
  opening a wastegate of an exhaust gas turbocharger of the internal combustion engine.

2. The method of claim 1, comprising filtering the acquired values for the combustion chamber pressure by forming sliding mean values.

3. The method of claim 1, comprising calculating the theoretical pressure values using a thermodynamic model based on at least one of: the crankshaft angle, a coolant temperature, an engine oil temperature, and a pressure value in an intake manifold of the internal combustion engine.

4. The method of claim 3, comprising storing the theoretical pressure values in a memory of the control device in the form of characteristic diagrams.

5. The method of claim 1, comprising:
  increasing a counter reading of a counter in the control device for each determination that the difference exceeds the threshold value,
  identifying the autoignition in the combustion chamber upon the counter reading reaching a predefined counter threshold value; and
  initiating the measure if the counter reading exceeds a threshold counter value.

6. The method of claim 5, comprising increasing the counter reading by a greater amount in response to a determination that the difference that exceeds the threshold value if the crankshaft angle value of the autoignition is earlier than or equal to a predefined threshold angle.

7. A device for detecting and responding to autoignition in a spark-ignited internal combustion engine, having at least one cylinder which, together with a piston connected to a crankshaft, bounds a combustion chamber, a combustion chamber pressure sensor for measuring the pressure in the combustion chamber, a crankshaft angle sensor which supplies a signal which represents a crankshaft angle, and a control device for performing open-loop and/or closed-loop control of the internal combustion engine, wherein the device is configured to:
  during a compression stroke of the internal combustion engine, acquire values for the combustion chamber pressure at defined crankshaft angles within an evaluation window,
  determine filtered pressure values from the acquired values for the combustion chamber pressure,
  determine, for the defined crankshaft angles, theoretical pressure values in the combustion chamber that would occur if no combustion were to take place in the combustion chamber based at least in part on geometric variables of the internal combustion engine including at least one of a cubic capacity and a compression ratio,
  determine a value of a filtered pressure gradient between filtered pressure values for two defined crankshaft angles,
  determine a value of a theoretical pressure gradient between theoretical pressure values for two defined crankshaft angles,
  determine a difference between the value of the filtered pressure gradient and the value of the theoretical pressure gradient,
  compare the determined difference with a predefined threshold value, and
  identify an autoignition in the combustion chamber in response to determining that the difference exceeds the predefined threshold value; and
  initiate a measure that results in a temperature decrease in the combustion chamber if an autoignition is identified, wherein the measure comprises one or more of the following:
    setting a rich air/fuel mixture,
    closing a throttle valve of the internal combustion engine,
    shutting off a fuel supply, or
    opening a wastegate of an exhaust gas turbocharger of the internal combustion engine.

8. The device of claim 7, further configured to filter the acquired values for the combustion chamber pressure by forming sliding mean values.

9. The device of claim 7, further configured to calculate the theoretical pressure values using a thermodynamic model based on at least one of: the crankshaft angle, a coolant temperature, an engine oil temperature, and a pressure value in an intake manifold of the internal combustion engine.

10. The device of claim 9, further configured to store the theoretical pressure values in a memory of the control device in the form of characteristic diagrams.

11. The device of claim 7, further configured to:
  increase a counter reading of a counter in the control device for each determination that the difference exceeds the threshold value,
  identify the autoignition in the combustion chamber upon the counter reading reaching a predefined counter threshold value; and
  initiate the measure if the counter reading exceeds a threshold counter value.

12. The device of claim 11, further configured to increase the counter reading by a greater amount in response to a determination that the difference that exceeds the threshold value if the crankshaft angle value of the autoignition is earlier than or equal to a predefined threshold angle.

13. A spark-ignited internal combustion engine, comprising:
- at least one cylinder which, together with a piston connected to a crankshaft, bounds a combustion chamber,
- a combustion chamber pressure sensor for measuring the pressure in the combustion chamber,
- a crankshaft angle sensor which supplies a signal which represents a crankshaft angle,
- a control device for performing open-loop and/or closed-loop control of the internal combustion engine, and
- a device configured to detect autoignition by a process including:
- during a compression stroke of the internal combustion engine, acquiring values for the combustion chamber pressure at defined crankshaft angles within an evaluation window,
- determining filtered pressure values from the acquired values for the combustion chamber pressure,
- determining, for the defined crankshaft angles, theoretical pressure values in the combustion chamber that would occur if no combustion were to take place in the combustion chamber based at least in part on geometric variables of the internal combustion engine including at least one of a cubic capacity and a compression ratio,
- determining a value of a filtered pressure gradient between filtered pressure values for two defined crankshaft angles,
- determining a value of a theoretical pressure gradient between theoretical pressure values for two defined crankshaft angles,
- determining a difference between the value of the filtered pressure gradient and the value of the theoretical pressure gradient,
- comparing the determined difference with a predefined threshold value,
- identifying an autoignition in the combustion chamber in response to determining that the difference exceeds the predefined threshold value; and
- initiating a measure that results in a temperature decrease in the combustion chamber if an autoignition is identified, wherein the measure comprises one or more of the following:
  - setting a rich air/fuel mixture,
  - closing a throttle valve of the internal combustion engine,
  - shutting off a fuel supply, or
  - opening a wastegate of an exhaust gas turbocharger of the internal combustion engine.

* * * * *